United States Patent [19]

Mochel et al.

[11] Patent Number: 4,508,952
[45] Date of Patent: Apr. 2, 1985

[54] ELECTRON BEAM CUTTING

[75] Inventors: Margaret E. Mochel, Champaign, Ill.; Colin J. Humphreys, Abingdon, England

[73] Assignee: University Patents, Inc., Westport, Conn.

[21] Appl. No.: 467,559

[22] Filed: Feb. 17, 1983

[51] Int. Cl.³ .............................................. B23K 15/00
[52] U.S. Cl. ....................... 219/121 EH; 219/121 EB; 219/121 EL
[58] Field of Search .................. 219/121 EH, 121 EJ, 219/121 EK, 121 EB, 121 EM, 121 EL

[56] References Cited

U.S. PATENT DOCUMENTS 2,793,281  5/1957  Steigerwald ........................ 219/121

FOREIGN PATENT DOCUMENTS 2740764  3/1979  Fed. Rep. of Germany ...... 219/121 EJ

OTHER PUBLICATIONS

Schollhammer, "Electron Beam Cutting Techniques for Electronic Applications", The 6th National IRE Conference, Nov., 1962, pp. 1-12.

Primary Examiner—C. L. Albritton
Attorney, Agent, or Firm—George M. Yahwak

[57] ABSTRACT

A method for the cutting of holes 20 Angstroms in diameter, or lines 20 Angstroms wide in a material having positive ionic conduction by the use of a focused electron probe is described. The holes and lines are stable under ambient conditions.

3 Claims, 2 Drawing Figures

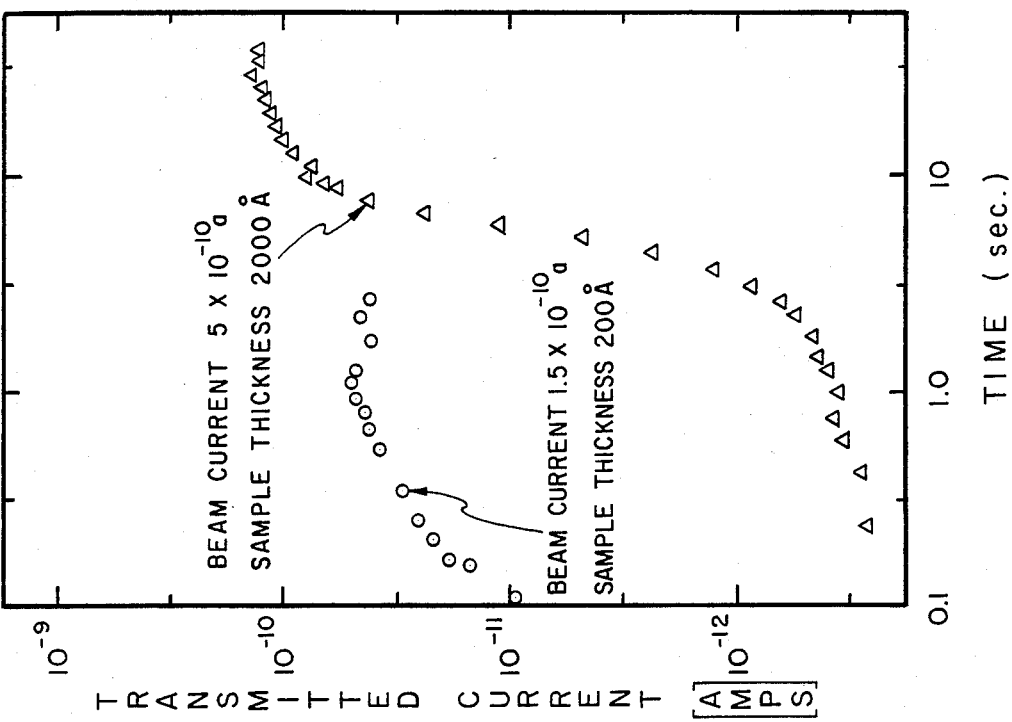
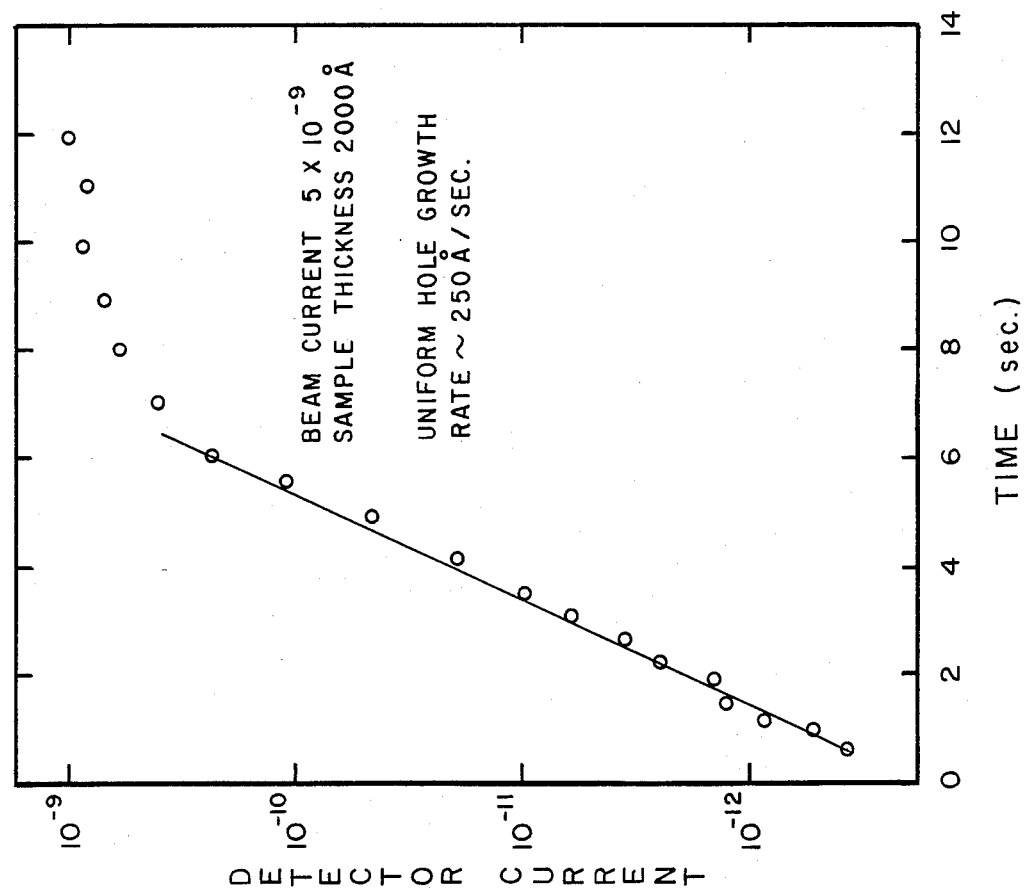

ELECTRON BEAM CUTTING

This invention was made in the course of research funded by the Department of Energy, Division of Materials Science through the University of Illinois Material Research Laboratory, under Contract No. DE-AC02-76ER01198, and carried out in the Center For the Microanalysis of Materials at the University of Illinois.

BACKGROUND OF THE INVENTION

Prior to the present invention, no one has been able to produce clean holes in a material on a 20 Angstrom scale; the minimum width of isolated lines made on solid substrates is currently about 0.1 m (Ahmed and McMahon; *Microscopy of Semiconducting Materials,* page 421 (1981) The Institute of Physics, Bristol and London). Structures with dimensions of about 100 Angstroms have been reported (Broers; *Microcircuit Engineering* pg. 9 (1980) Delft University Press) by focusing an electron beam onto a thin substrate covered with an oil film, thereby polymerizing the oil to form a contamination resist layer. Electron beam writing has also been reported (Isaacson and Murray, *J. Vac. Sci. Technology,* 19(4):1117, (1981) American Vacuum Society) in sodium chloride crystals on a carbon substrate.

Extensive research has been conducted on the properties and uses of Beta-alumina since its first being reported by Rankin and Merwin in 1916.

More specifically, by the term Beta-alumina as used in reference to the present disclosure, we refer to a class of materials having structures similar to or related to the composition:

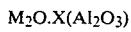

$M_2O \cdot X(Al_2O_3)$ commonly referred to as β-alumina wherein M is a metal such as sodium, potassium, lithium, rubidium, silver, copper, ammonium, lead, etc., and wherein X is an integer from 5 to 11. Also included are all polytypes of β-alumina, for example, β″, β‴, and β⁗-aluminates which have been stabilized by the addition of an additional metal oxide such as magnesium oxide or lithium oxide or a mixed oxide and which has the composition:

$M_2O \cdot x(MgO) \cdot y(Al_2O_3)$

Wherein M is a metal, and x and y are not necessarily integers and the composition is not necessarily stoichiometric. These materials are all positive ionic conductors having no electron conduction. In order for the electron cutting of the present invention to occur, the material (such as Beta-alumina) is required to be a positive ionic conductor.

SUMMARY OF THE INVENTION

During our research to study the mechanisms of electron damage to Beta-alumina, and to address problems encountered in using these materials in batteries, we discovered that the small focused electron beam of an HB5 electron microscope was capable of directly cutting small, clean holes in the material with significantly higher resolution and contrast than current lithography methods and involving no chemical development.

BRIEF DESCRIPTION OF THE DRAWINGS

FIG. 1 is a histogram of the optimum beam current necessary to cut a hole through a 2000 angstrom sample.

FIG. 2 is a histogram of the optimum current necessary to achieve a uniform hole growth rate.

DESCRIPTION OF THE INVENTION

More specifically, we found that holes 20 Angstroms in diameter, and lines 20 Angstroms wide can be cleanly cut by a small intense electron beam in materials which are positive ionic conductors and which exhibit minimal or no electron conduction. Among these materials is Beta-alumina such as sodium-β-alumina, sodium β″-alumina, lithium-β-alumina, potassium-β-alumina, lead-β-alumina, and silver-β-alumina. Cutting can proceed along any crystal direction in the material, and can penetrate material from the thinnest that can be handled to material more than 1000 Angstroms thick while maintaining the small 20 Angstrom diameter; an unobtainable goal prior to the present invention. The holes and lines remain stable, the specimen can be removed from the cutting chamber, and can be returned to the chamber for further cutting or examination at reduced beam intensities. The β-aluminas, once cut, are stable to air and tolerate exposure to air without degredation of the electron beam cut patterns.

The cutting chamber wherein the polycrystalline β-alumina was exposed to the focused electron beam has, in our initial series of experiments, been the vacuum examination chamber of a Vacuum Generators HB5 UHV scanning transmission electron microscope. The vacuum at the specimen material was routinely $8 \times 10^{-9}$ torr., however, this was because of the capability of the electron microscope; other experiments have generally indicated that any vacuum better than about $10^{-8}$ torr. will be sufficient. Current at the specimen material was routinely about $10^4$ amp/cm$^2$; lower currents may also be used, however, our findings indicate a current of at least $10^3$ amp/cm$^2$ is required for the test system available at the present time. Furthermore, the incident electron energy that different systems are capable of obtaining, appears to have little effect on the quality of the holes. We have found, for example, that levels of 40, 60, 80, and 100 keV in our test system gave holes of the same quality. There is also the possibility that a level of 20 keV would be affective, however, because it is difficult to align the optics properly, this low level is not preferred.

Although the cutting chamber, vacuum, and current levels of the present invention have been determined because of the design system of the specific electron microscope, it would be possible to utilize chambers specifically designed for the process according to the present invention.

The process by which such holes, according to the present invention, are generated is not completely understood. The process does depend, however, upon the unique properties of the material, particularly its positive ionic conduction. With β-alumina, one proposed model to explain this cutting suggests that this cutting is due to the ionization of atoms in the material which subsequently react chemically to leave the clean hole. In this proposal, the cutting process is separated into four evolutionary stages as follows:

(1) An intense small diameter electron beam penetrates the material (although the electron beam has an irregular, non-gaussian form being sharply peaked in the center, the diameter has been considered to be 10 Angstroms which approximates the size of the central part of the beam); the material within the beam, due to scattering of electrons from the material within the beam volume (secondary electron production) becomes positively charged;

(2) The positively charged ions, for example the sodium ions of a sodium-β-alumina sample, which are mobile and lie between the planes of the poly crystalline material, such as the alumina planes of β-aluminas, are repelled from this positively charged region. With the removal of these ions and no electron conduction, the irradiated region becomes insulating and continues to accumulate a positive charge. Although this region within the material and the electron beam quickly charges to several volts (the energy of the secondary electrons), the material outside the beam is still conducting;

(3) The resultant intense electric field, of the order of approximately one volt per Angstrom, which extends from the axis of the beam to the conducting region just outside the beam weakens the atomic bonding of the material; and (4) Due to this weakening of bonds, the material moves away from the position on the sample where the beam enters and leaves the material forming a cavity at each surface. The process is complete when the two cavities increase in depth to form a single hole of uniform diameter through this material.

Thus, the process according to the present invention causes the material, a positive ionic conductor, within the volume of the beam passing through the conducting material to destabilize and disintegrate as a result of the intense electric fields created in the volume defined by the electron beam passing through the material. The result is a "disintegration" process which is self-stabilizing around the electron beam, and the formation of straight clean holes through the material.

As noted previously this is a threshold beam current for any cutting or damage to appear. This beam current threshold is consistent with the model for the cutting process; for beam currents lower than that necessary to produce a current at the material sample of about $10^3$ amp/cm$^2$, some of the positively charged metal ion, for example Na$^+$ when sodium-β-alumina is the material, could remain within the beam. If this were to occur, there would be no significant charging, no strong electric field, and no resulting breakdown of the material.

By moving the electron beam over the surface of the material, it is also possible to extend the holes to form channels. And, by moving the beam, any desired pattern of holes or channels could be drawn. It is also possible to cut parts of the material completely off by using the process of the present invention thereby machining the material to a specific desired shape within a 20 Angstrom accuracy. Also, it is possible to cut holes or channels larger than 20 Angstroms in diameter, or in width with respect to channels, merely by moving the 10 Angstrom electron probe around the outer periphery of the opening until the desired sized opening is obtained. Of course, in each of these instances, the process according to the present invention may be modified by moving the material being cut in lieu of the beam. Furthermore, larger holes can be made by increasing the size of the 10 Angstrom electron probe. Using the HB5 electron microscope's electron beam, for example, good quality holes can be made of at least a 100 Angstrom diameter before the current density drops below that needed for cutting. Furthermore, it is clear from the hole cutting model proposed that holes and lines smaller than 20 Å across may be cut by decreasing the size of The electron probe. The minimum hole diameter that could be cut by the present method is one atomic diameter, which is typically 3 Å.

The class of materials within which such beam cutting can occur are the positive ionic conductors with minimal electronic conduction. Materials such as copper, silicon, zinc oxide, and carbon show little evidence of cutting or surface change with the possible exception of contamination; other materials such as sodium hydroxide exhibit a large scale "melting" or "boiling off" response with the structure of the film changing; and still other materials such as quartz or diamonds, the surface film is actually removed leaving large crater-like openings in material greater than about 500 Angstroms thick, or large (about 100 Angstroms in diameter) holes with undefined edges in material samples less than 200 Angstroms thick. It is also possible under the present process to cut holes and channels in β-alumina coated with materials such as carbon, aluminum, or gold (however we have found that with continued irradiation the gold tends to flow into and fill up the holes.

The ability to form and cut materials within the size boundaries of those obtainable by the present invention has major importance.

In atomic lithography, the layered structure of the β-aluminas allows it to be cleaved or grown in thin sheets. A small piece of Na-β-alumina 1 mm by 1 mm by 1000 Angstroms thick can be placed directly on a SiO$_2$, sapphire, or metal surface upon which masked vapor deposition is to be made. An electron beam as described above, will cut simply connected geometries, uniform in dimension (that is, minimum spreading of the pattern, This is a problem endemic to resist techniques), with an ultimate precision of 20 Angstroms. Although the electron beam easily cuts the Na-β-alumina, this beam will not significantly damage the substrate. In contrast to other electron beam lithography processes, which often use photo-resists, the process described here is a clean (all done in vacuum), one step process. Further, vapor deposition of the desired metal, semiconductor or insulator through the fresh-cut β-alumina mask can be carried out without moving the mask. In this fashion, mask alignment problems are also eliminated. These benefits for the process of lithography arise directly from the in-situ cutting of β-alumina by the process described above. A beta-alumina mask may similarly be used for semiconductor integrated circuit fabrication processes other than vapor deposition, for example ion implantation.

Also, for high density storage, a thin layer of a positive ionic conductor can be placed or grown on a metal surface. For example, a layer of aluminum oxide produced by anodization can be converted to Na-β-alumina in the presence of Na. Or the easily obtained and nearly perfect SiO$_2$ layer on a single crystal of silicon can be converted to an ionic conductor (Li$_4$SiO$_4$) by heating in the presence of Li and oxygen. Or a large class of silver based ionic conductors can be formed on the surface of silver by electrolysis in a metal-AgI water solution where the metal, for example, could be Rb to form RbAg$_4$I$_5$. A beam of electrons, as described above, can generate uniform holes on a 100 Angstrom grid (or smaller). A point on this grid would correspond to one bit of information and a hole at that point would correspond to bit set "high". For a 100 Angstrom grid, the information density would be more than 1000 megabytes per square millimeter. Since, as described above, there is a threshold electron beam current before any damage is done to the ionic conductor, readout of the information could also be done by an electron beam.

In order to demonstrate the utility of the present method, a number of experiments were conducted, data collected and tabulated, and the results graphically depicted. Two such depictions appear in FIGS. 1 and 2.

FIG. 1 indicates the log of the unscattered electron current is a transmitted electron current reading at a photomultiplier detector as plotted against the log of the time during which the focused electron beam is stationary on the sample of material. For the thin sample (200 Angstroms), the hole is cut in less than a second at a beam intensity of about $10^4$ Amp/cm$^2$. However, because there is considerable transmission of electrons through the thin material, the difference in contrast between the pretreated and post treated materials is only about a factor of three. For the thick sample (2000 Angstroms) the cutting procedure is longer, however more than 1000 times as many electrons go through the opening as through an equivalent areas of specimen, and thereby the difference in contrast is very high.

FIG. 2 indicates the log of the transmitted electron current plotted against the time during which the beam is stationary on a 2000 Angstrom thick sample of material. The initial exponential rise of the curve indicates a uniform hole growth rate of 250 Angstroms per second; the upper flattening portion indicates the widening of the hole diameter.

Thus, while we have illustrated and described the preferred embodiment of our invention, it is to be understood that this invention is capable of variation and modification, and we therefore do not wish to be limited to the precise terms set forth, but desire to avail ourselves of such changes and alternations which may be made for adapting the invention to various usages and conditions. Accordingly, such changes and alternations are properly intended to be within the full range of equivalents, and therefore within the purview, of the following claims.

Having thus described our invention and the manner and process of making and using it, in such full, clear, concise, and exact terms so as to enable any person skilled in the art to which it pertains, or with which it is most nearly connected, to make and use the same,

We claim:

1. A method for providing an opening through a positive ionic conductor material having minimal electron conduction which comprises (a) placing said material in a vacuum, and (b) exposing a region of said material to a focused electron beam having a current level sufficient to cause the material within said region to become positively charged, and causing the positively charged ions within said region to be repelled from said region.

2. In a method for atomic lithography which comprises providing a lithography mask having a pattern cut thereinto, the improvement comprising cutting said pattern in said mask in accordance with the method of claim 1.

3. The method according to claim 1 in which the material is $\beta$-alumina.

* * * * *